United States Patent
Yi et al.

(10) Patent No.: US 12,120,039 B2
(45) Date of Patent: Oct. 15, 2024

(54) TRAFFIC ALARM METHOD AND APPARATUS BASED ON PROGRAMMABLE SWITCH, DEVICE AND MEDIUM

(71) Applicant: ZHEJIANG LAB, Zhejiang (CN)

(72) Inventors: Xiaoyu Yi, Hangzhou (CN); Yuan Liang, Hangzhou (CN); Geyang Xiao, Hangzhou (CN); Xingchang Guo, Hangzhou (CN); Tao Zou, Hangzhou (CN); Ruyun Zhang, Hangzhou (CN); Linlin Yan, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/389,820

(22) Filed: Dec. 20, 2023

(65) Prior Publication Data
US 2024/0214324 A1    Jun. 27, 2024

Related U.S. Application Data

(63) Continuation of application No. PCT/CN2023/075608, filed on Feb. 13, 2023.

(30) Foreign Application Priority Data

Dec. 22, 2022    (CN) ......................... 202211659106.3

(51) Int. Cl.
*H04L 47/6275*    (2022.01)
*H04L 47/12*    (2022.01)

(52) U.S. Cl.
CPC .......... *H04L 47/6275* (2013.01); *H04L 47/12* (2013.01)

(58) Field of Classification Search
CPC ... H04L 47/263; H04L 47/225; H04L 47/122; H04L 47/12; H04L 47/20; H04L 47/10
See application file for complete search history.

(56) References Cited

U.S. PATENT DOCUMENTS 9,277,452 B1    3/2016 Aithal et al.
11,064,395 B1 *    7/2021 Marupaduga ........... H04W 8/18
(Continued)

FOREIGN PATENT DOCUMENTS

CN    105163352 A    12/2015
CN    108243117 A    7/2018
(Continued)

OTHER PUBLICATIONS

Nguyen et al., "Implementation of a Quality of Service Feedback Control Loop On Programmable Routers" IEEE , 2004 (Year: 2004).*

(Continued)

*Primary Examiner* — Omer S Mian
(74) *Attorney, Agent, or Firm* — W&G Law Group

(57) ABSTRACT

A traffic alarm method and apparatus based on a programmable switch, a device and a medium. The method monitors traffic with different priorities, when the traffic is greater than or equal to a threshold, the programmable switch may give a real-time alarm on a data plane and return low priority traffic information in a current network back to a sending end, and the sending end may adjust a task priority through alarm information. The present disclosure uses a programmable switch device, the lower priority traffic information may be alarmed to the sending end in real time on the data plane without passing through a controller, an alarm delay is significantly reduced, the sending end may adjust a sending rate timely, real-time scheduling of network traffic is achieved, high priority traffic transmission is ensured, and meanwhile link utilization is improved.

9 Claims, 3 Drawing Sheets

(56) References Cited

U.S. PATENT DOCUMENTS

| | | | |
|---|---|---|---|
| 2004/0078460 A1* | 4/2004 | Valavi | H04L 41/0896 |
| | | | 709/224 |
| 2014/0112140 A1* | 4/2014 | Chan | H04L 47/32 |
| | | | 370/235 |
| 2016/0021014 A1* | 1/2016 | Wetterwald | H04L 47/2441 |
| | | | 370/235 |
| 2021/0119920 A1* | 4/2021 | Tesanovic | H04W 28/0278 |

FOREIGN PATENT DOCUMENTS

| | | |
|---|---|---|
| CN | 111628940 A | 9/2020 |
| CN | 112714071 A | 4/2021 |
| CN | 113079107 A | 7/2021 |
| WO | 2022161206 A1 | 8/2022 |

OTHER PUBLICATIONS

Iniya et al., "Improving Congestion Control in WSN By Multipath Routing With Priority Based Scheduling" IEEE 2017 (Year: 2017).*
International Search Report (PCT/CN2023/075608); Date of Mailing: Sep. 1, 2023.
First Office Action(CN202211659106.3); Date of Mailing: Aug. 18, 2023.

* cited by examiner

TRAFFIC ALARM METHOD AND APPARATUS BASED ON PROGRAMMABLE SWITCH, DEVICE AND MEDIUM

CROSS-REFERENCE TO RELATED APPLICATIONS

The present application is a continuation of International Application No. PCT/CN2023/075608, filed on Feb. 13, 2023, which claims priority to Chinese Application No. 202211659106.3, filed on Dec. 22, 2022, the contents of both of which are incorporated herein by reference in their entireties.

TECHNICAL FIELD

The present disclosure relates to the technical field of computer networks, and in particular, to a traffic alarm method and apparatus based on a programmable switch, a device and a medium.

BACKGROUND

With the development of the Internet, different service traffic has different priorities, it is necessary to adjust the sent service traffic in real time according to a service priority, thereby achieving full utilization of a link bandwidth. In order to ensure the service quality of a high priority, people usually use proprietary network transmission links or reserve separate resources for each service in network transmission, and the link bandwidth usually cannot work at full capacity, which seriously wastes resources.

SUMMARY

In view of shortcomings in the prior art, an objective of the present disclosure is to provide a traffic alarm method and apparatus based on a programmable switch, a device and a medium.

In order to achieve the above objective, the present disclosure provides a traffic alarm method based on a programmable switch, including the following steps:

(1) Receiving a data packet sent from a sending end, the data packet carrying different priority information.

(2) Monitoring a traffic rate of the data packet in real time, and adopting different processing logics according to different traffic rates; when the traffic rate is smaller than a threshold, forwarding the data packet to a receiving end directly without any processing on the data packet, and when the traffic rate is greater than or equal to the threshold, sampling a traffic to acquire priority information in the data packet and multicasting on the data packet.

(3) Comparing the priority information in the data packet with historical priority information, and feeding back lowest priority information after comparison to the sending end in real time.

(4) Adjusting, by the sending end, a sending service timely according to real-time feedback information to reduce the traffic rate of a low priority.

Further, the higher a priority of the data packet is, the larger a numerical value of the priority of the data packet is.

Further, the step (2) includes the following sub-steps:

(2.1) Adopting the different processing logics according to the different traffic rates: marking the traffic of the data packet passing through the programmable switch by using a built-in meter of the programmable switch, and the data packet with different traffic rates is marked as different colors; when the data packet passes through the programmable switch and the traffic rate of the data packet is greater than or equal to the threshold, marking the data packet as red, and sampling the data packet; and when the data packet passes through the programmable switch and the traffic rate of the data packet is smaller than the threshold, marking the data packet as green, and forwarding the data packet to the receiving end according to forwarding table information.

(2.2) Multicasting on the data packet: connecting a port multicast by the data packet to the sending end and the receiving end, the data packet multicasting to the receiving end is not modified and maintains in an original service state; and the data packet multicasting to the sending end carries the priority information to achieve an alarm on the sending end.

Further, sampling specifically includes: counting the data packet passing through the programmable switch by using a register of the programmable switch, when a quantity of the data packet is greater than or equal to a sampling interval, multicasting on a next data packet after counting, and setting a numerical value of the register to be 0 for re-counting.

Further, the step (3) includes the following sub-steps:

(3.1) Extracting a value of a priority of the data packet obtained by sampling, and comparing the value with historical priority information stored in a register of the programmable switch; if the value of the priority of the data packet is smaller than a value of a priority in the register, the value in the register is replaced with the value of the priority of the current data packet; if the value of the priority of the data packet is greater than or equal to the value of the priority in the register, the value of the priority of the current data packet is unchanging.

(3.2) Feeding back the lowest priority information to the sending end: modifying the data packet multicasting to the sending end, and modifying a priority field of the data packet to a lowest priority, so as to feed back the lowest priority information in a current link to the sending end.

Further, a value range of the threshold is from 0 to 10 Gbps; and a range of the sampling interval is from 0 to $32^{nd}$ power of 2.

Further, the register stores the lowest priority information in the traffic in real time.

In order to achieve the above objective, the present disclosure further provides a traffic alarm apparatus based on a programmable switch, including one or more processors, configured to implement the above traffic alarm method based on the programmable switch.

In order to achieve the above objective, the present disclosure further provides an electronic device, including a memory and a processor coupled with each other, the memory is configured to store program data, and the processor is configured to execute the above traffic alarm method based on the programmable switch.

In order to achieve the above objective, the present disclosure further provides a computer readable storage medium on which a computer program is stored, the program, when executed by a processor, is configured to implement the above traffic alarm method based on the programmable switch.

Compared with the prior art, the present disclosure has the beneficial effects: the present disclosure uses the programmable switch to directly give a traffic alarm on a data plane without passing through a control plane, and a time delay of the alarm is significantly reduced; and meanwhile, the present disclosure can inform the sending end of a lowest priority of the data packet in a current link, and can help the sending end adjust the priority and sending rate of the sent data packet in real time, so that the service quality of the network is significantly ensured.

DESCRIPTION OF EMBODIMENTS

Exemplary embodiments will be described in detail herein, and examples of the exemplary embodiments are shown in accompanying drawings. When the following description refers to the accompanying drawings, unless otherwise indicated, the same numbers in different accompanying drawings indicate the same or similar elements. The implementations described in the following exemplary embodiments do not represent all implementations consistent with the present disclosure. Rather, they are merely instances of apparatuses and methods consistent with some aspects of the present disclosure as detailed in the appended claims.

The terms used in the present disclosure are merely for the purpose of describing specific embodiments, and not intended to limit the present disclosure. The singular forms "a/an", "said" and "the" used in the present disclosure and the appended claims are further intended to include plural forms unless the context clearly indicates other meanings. It should be further understood that the term "and/or" used herein indicates and includes any or all possible combinations of one or more associated listed items.

It should be understood that although the terms first, second, third, etc. may be used to describe various information in the present disclosure, such information should not be limited to these terms. These terms are merely used to distinguish the same type of information from each other. For example, without departing from the scope of the present disclosure, first information may further be referred to as second information, and similarly, the second information may further be referred to as the first information. Depending on the context, for example, the word "if" used herein may be interpreted as "while" or "when", or "in response to determination".

The present disclosure is described in detail with reference to accompanying drawings below. In the case of no conflict, embodiments and features in the implementations may be combined mutually.

Embodiment 1

Figure 1:
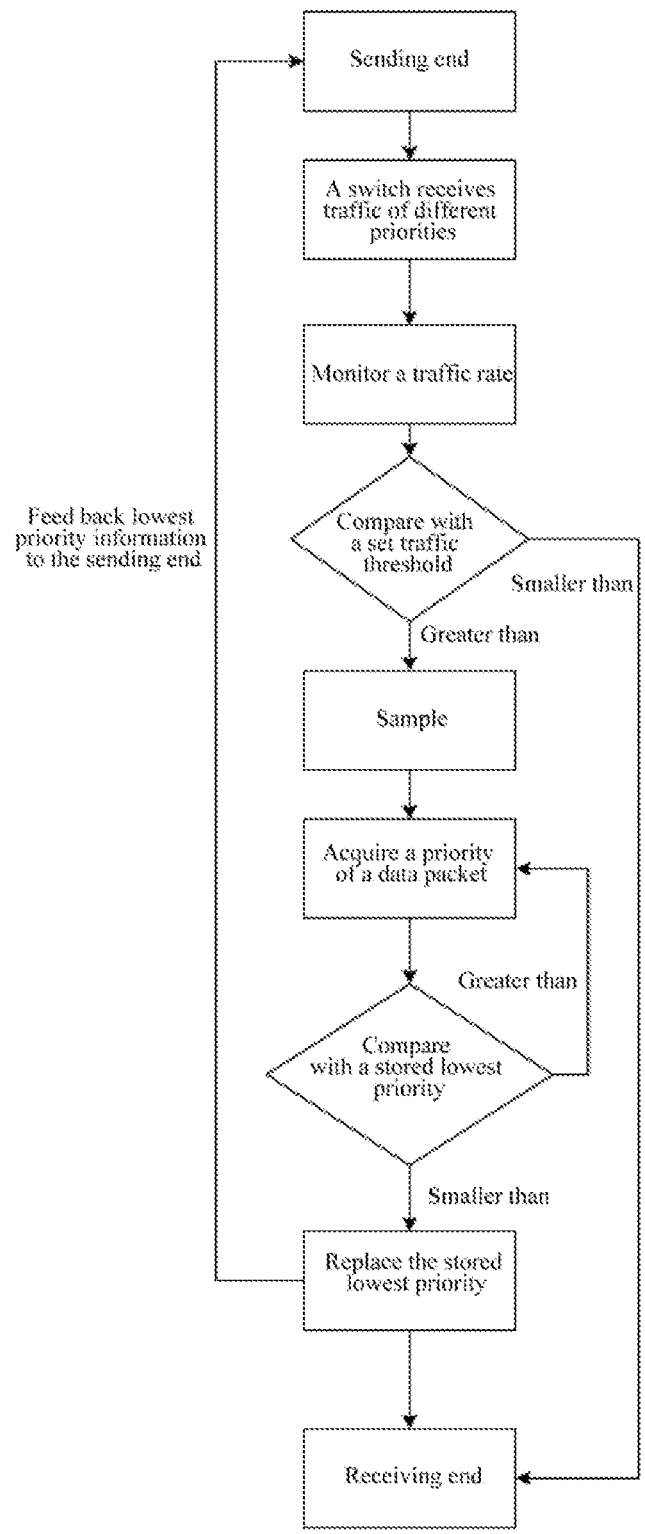
FIG. 1 is a flow chart of a traffic alarm method based on a programmable network switch illustrated according to an exemplary embodiment.

As shown in FIG. 1, the present disclosure provides a traffic alarm method based on a programmable switch, including the following steps:
Step 1: the programmable switch receives the data packet sent from a sending end server, the sending end server is connected with the programmable switch, and the data packet enters the programmable switch through one of 32 input ports. According to service requirements, the data packet carries different priority information, the higher the priority of the data packet, the larger a numerical value of the priority. For example, comparing a data packet with the priority value priority_id=5 with a data packet with the priority value priority_id=3, the priority of the data packet with the priority value priority_id=5 is higher.

Step 2: traffic of the current data packet passing through the switch is marked by using a function of a built-in meter of the programmable switch: a set threshold is issued to the programmable switch through a controller, a value range of the threshold may be 0-10 Gbps, and in this embodiment, the set threshold is METER_SPEC_PIR_KBPS=4000000, namely 4 Gbps. When the traffic rate is greater than or equal to 4 Gbps, the data packet may be marked as red, namely meta.color=0x3, and at this time, the programmable switch samples the data packet; and when the rate is lower than 4 Gbps, the data packet will be marked as green, namely meta.color=0x0, and at this time, the programmable switch forwards the data packet to a receiving end server according to forwarding table information.

Sampling is achieved through a register, a sampling interval may be 0 to $32^{nd}$ power of 2, in this embodiment, the sampling interval is set to be RED_COUNT-60000, and the register is initialized to 0. The register counts the data packet marked as red meta.color-0x3, when a numerical value of the register is greater than or equal to 60000, a next data packet is sampled, and the numerical value of the register is set to be 0 for re-counting, that is, sampling is performed every 60000 data packets. Then the programmable switch performs multicast on the sampled data packet, a multicast port is connected with the receiving end server and the sending end server; the programmable switch maintains in an original service state without any processing on the data packet subjected to multicast to the receiving end; and the data packet subjected to multicast to the sending end is modified, such that the data packet carries the priority information to achieve an alarm on the sending end.

Step 3: the programmable switch extracts the priority priority_id=3 of the current data packet obtained by sampling, and initializes the register, the numerical value of the register is register_data=6, namely 0-5, at this time, 5 is a maximum priority value in the current link, and then the numerical value of the priority in the current data packet is compared with the numerical value in the register; and if the numerical value of the register register_data is greater than the numerical value of the priority priority_id, the numerical value of the register is updated to the numerical value of the priority of the current data packet, otherwise it remains unchanged, so that the register of the programmable switch stores the lowest priority in the traffic in real time. The programmable switch modifies the data packet which is subjected to multicast to the sending end, and modifies a priority field of the data packet to a numerical value of the lowest priority, that is, the field of the numerical value of the priority priority_id is modified to 3; and then the modified data packet is subjected to multicast to the sending end, and at this time, the lowest priority information is fed back to the sending end in real time.

Step 4: the sending end adjusts a sending service timely according to the information which is fed back by the programmable switch in real time to reduce a traffic rate of a low priority, the high priority traffic transmission is ensured, and meanwhile a utilization of the link is improved.

Embodiment 2

According to the traffic alarm method based on the programmable switch provided by the present disclosure, IPv4 is taken as an example, when a differentiated service of IPV4 traffic is achieved through a differentiated services code point (DSCP) field in a head, according to the definition of RFC2474 (DSCP standard document), a DSCP occupies 8 bits, of which 6 bits are used, and the lowest 2 bits are not used. Different numerical values of the DSCP field represent different priority information, and the higher the value of the DSCP, the higher the priority of the data packet. When DSCP=32, it is usually used by video conferencing and video streaming; when DSCP=40, it usually corresponds to voice data; and when DSCP=8, it usually corresponds to an ordinary data service. In a live video conference, a voice data priority is greater than a video stream priority, and the video stream priority is greater than an ordinary data service priority, network transmission first needs to ensure the transmission of audio information, followed by video stream, and finally ordinary data services. By adopting this method, the traffic information in the link may be directly fed back to an application end from the data plane, the bandwidth of the high-priority data packet is ensured, and thus user experience of video conferencing live broadcast is improved. This example of IPV4 has the following steps:
(1) The programmable switch receives an IPV4 data packet sent from a sending end server, and the programmable switch parses the IPv4 data packet.
(2) The current IPv4 data packet passing through the switch is marked by using a function of a meter of the programmable switch: a set threshold is issued to the programmable switch through a controller, the set threshold is METER_SPEC_PIR_KBPS=10000000, namely 10 Gbps. When the traffic rate is greater than or equal to 10 Gbps, the data packet may be marked as red, namely meta.color=0x3, and at this time, the programmable switch samples the data packet; when the rate is lower than 10 Gbps, the data packet may be marked as green, namely meta.color=0x0, and at this time, the programmable switch forwards the data packet to a receiving end according to forwarding table information; and a color marking process is processed at a limited speed on the data plane, without causing additional delay.

The data packet is sampled through the register, a sampling interval is set to be RED_COUNT=90000, the data packet marked as red meta.color=0x3 is counted, and sampling is performed every 90000 data packets. The programmable switch modifies a DSCP field of the IPV4 data packet which is subjected to multicast to the sending end, a value of the modified DSCP is obtained through step (3), after receiving the priority information, the sending end may adjust sending rates of different service types, the traffic rate of the low priority is reduced, so that normal transmission of the data packet with the high priority is ensured, and high-quality transmission of the audio information in video conferencing live broadcast is achieved.
(3) The programmable switch extracts the priority of the current data packet obtained by sampling, and initializes the register, that is, the numerical value of the register is register_data=64, since the DSCP uses 6 bits, the numerical values (namely 0-63) of 64 (sixth power of 2) priorities may be defined, and then the numerical value of the priority in the current data packet is compared with the numerical value in the register; and if the numerical value of the register register_data is smaller than the numerical value of the priority priority_id, the numerical value of the register is updated to the numerical value of the priority of the current data packet, otherwise it remains unchanged. When the numerical value in the register is 8, it indicates that the traffic of the lowest priority in the current link is the ordinary data service, when the numerical value in the register is 32, it indicates that the traffic of the lowest priority in the current link is the video streaming, and at this time, the lowest priority information is fed back to the sending end in real time.
(4) The sending end receives the information which is fed back by the programmable switch in real time, if the numerical value of the fed back priority information is 8, it indicates that the current link has reached a highest utilization, and there is the traffic of 3 types of priorities in the current link. In order to ensure the quality of video conferencing live broadcast, it is necessary to reduce the rate of the ordinary data service step by step until the programmable switch does not send alarm information. If the numerical value of the fed back priority information is 32, it indicates that there is the traffic of 2 types of priorities in the current link. In order to ensure the audio experience of users participating in conferencing live broadcast, it is necessary to reduce the rate of video streaming step by step until the programmable switch does not send the alarm information. Once the alarm information is cleared, the sending end server may increase the sending rate step by step according to the priority of the service, and link resources are fully utilized.

Embodiment 3

Corresponding to the above embodiment of the traffic alarm method based on the programmable switch, the present disclosure further provides an embodiment of a traffic alarm apparatus based on a programmable switch.

Figure 2:
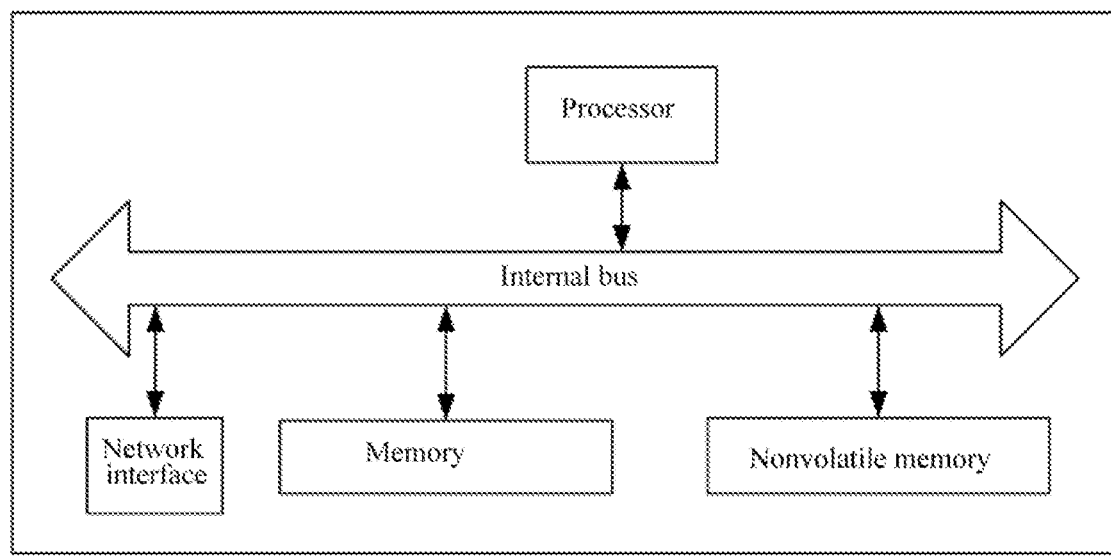
FIG. 2 is a schematic structural diagram of a traffic alarm apparatus based on a programmable network switch illustrated according to an exemplary embodiment.

Referring to FIG. 2, the traffic alarm apparatus based on the programmable switch provided by the embodiment of the present disclosure includes one or more processors, configured to implement the traffic alarm method based on the programmable switch in the above embodiment.

The embodiment of the traffic alarm apparatus based on the programmable switch of the present disclosure may be applied to any device with data processing capabilities, which may be devices or apparatuses such as a computer. The apparatus embodiment may be implemented by software, hardware or a combination of the hardware and the software. Taking software implementation as an example, as an apparatus in a logical sense, it is formed by reading corresponding computer program instructions in a nonvolatile memory to an internal memory by a processor of any device with the data processing capabilities. From the hardware level, as shown in FIG. 2, which is a hardware structural diagram of any device with the data processing capabilities where the traffic alarm apparatus based on the programmable switch is located of the present disclosure, in addition to a processor, an internal memory, a network interface and a nonvolatile memory shown in FIG. 2, any device with the data processing capabilities where the apparatus is located in the embodiment may usually further include other hardware according to an actual function of the device with the data processing capabilities, which will not be repeated here.

The implementation process of functions and effects of all units in the above apparatus specifically refers to the implementation process of corresponding steps in the above method, which will not be repeated here.

As for the apparatus embodiment, since it basically corresponds to the method embodiment, please refer to the partial description of the method embodiment for the relevant parts. The foregoing described apparatus embodiment is merely an example. The units described as separate parts may or may not be physically separate, and the parts displayed as units may or may not be physical units, may be located in one position, or may be distributed on a plurality of network units. Some or all of the modules may be selected according to actual needs to realize the purpose of the solution of present disclosure. Those of ordinary skill in the art may understand and implement it without creative labor.

Embodiment 4

Figure 3:
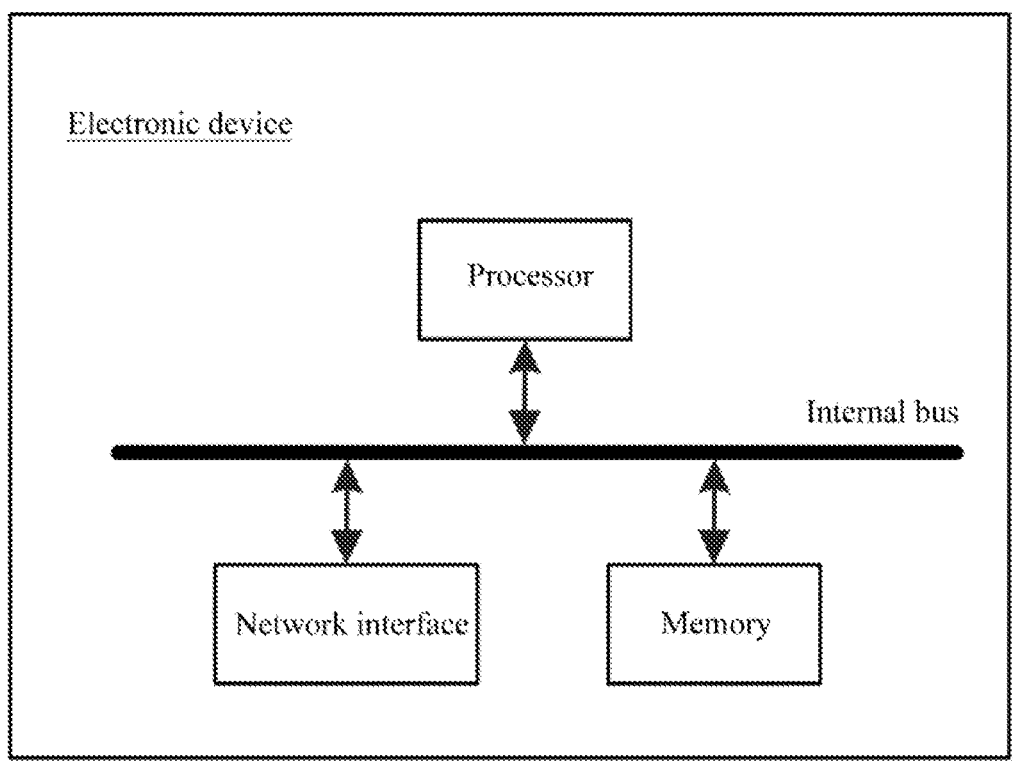
FIG. 3 is a schematic diagram of an electronic device illustrated according to an exemplary embodiment.

Corresponding to the above embodiment of the traffic alarm method based on the programmable switch, an embodiment of the present disclosure further provides an electronic device, including one or more processors; and a memory, configured to store one or more programs, and the one or more programs, when executed by the one or more processors, cause the one or more processors to implement the above traffic alarm method based on the programmable switch. As shown in FIG. 3, which is a hardware structural diagram of any device with the data processing capabilities where the traffic alarm method based on the programmable switch is located provided by an embodiment of the present disclosure, in addition to a processor, an internal memory, a DMA controller, a magnetic disk and a nonvolatile memory shown in FIG. 3, any device with the data processing capabilities where the apparatus is located in the embodiment may usually further include other hardware according to an actual function of the device with the data processing capabilities, which will not be repeated here.

Embodiment 5

Corresponding to the above embodiment of the traffic alarm method based on the programmable switch, an embodiment of the present disclosure further provides a computer readable storage medium, storing a computer program, and the program, when executed by a processor, implements the traffic alarm method based on the programmable switch in the above embodiment.

The above computer readable storage medium may be an internal storage unit of any device with the data processing capabilities described in any one of the above embodiments, such as a hard disk or an internal memory. The computer readable storage medium may further be any device with the data processing capabilities, such as a plug-in hard disk, a smart media card (SMC), an SD card and a flash card, provided on the device. Further, the computer readable storage medium may further include both the internal storage unit of any device with the data processing capabilities and an external storage device. The computer readable storage medium is configured to store the computer program and other programs and data required by any device with the data processing capabilities, and may further be configured to temporarily store data that has been or will be outputted.

The above is merely preferred embodiments of the present disclosure and is not used to limit the present disclosure, and any modification, equivalent replacement, improvement, etc. made within the spirit and principles of the present disclosure should be included in the scope of protection of the present disclosure.

The above embodiments are merely used to illustrate the design concept and characteristics of the present disclosure, with the aim of enabling those skilled in the art to understand the content of the present disclosure and implement it accordingly. The scope of protection of the present disclosure is not limited to the above embodiments. Therefore, any equivalent changes or modifications made based on the principles and design ideas disclosed in the present disclosure are within the scope of protection of the present disclosure.

What is claimed is:

1. A traffic alarm method based on a programmable switch, comprising:
   step (1) receiving a data packet sent from a sending end, wherein the data packet carries different priority information;
   step (2) monitoring a traffic rate of the data packet in real time, and adopting different processing logics according to different traffic rates; when the traffic rate is smaller than a threshold, forwarding the data packet to a receiving end directly without any processing on the data packet, and when the traffic rate is greater than or equal to the threshold, sampling a traffic to acquire priority information in the data packet and multicasting on the data packet;
   step (3) comparing the priority information in the data packet with historical priority information, and feeding back the compared lowest priority information to the sending end in real time;
   sub-step (3.1) extracting a value of a priority of the data packet obtained by sampling, and comparing the value with historical priority information stored in a register of the programmable switch; wherein when the value of the priority of the data packet is smaller than a value of a priority in the register, the value in the register is replaced with the value of the priority of the data packet; when the value of the priority of the data packet is greater than or equal to the value of the priority in the register, the value of the priority of the data packet is unchanging; and
   sub-step (3.2) feeding back the lowest priority information to the sending end: modifying the data packet multicasting to the sending end, and modifying a priority field of the data packet to a lowest priority, so as to feed back the lowest priority information in a link to the sending end; and
   step (4) adjusting, by the sending end, a sending service timely according to real-time feedback information to reduce the traffic rate of the data packet that carries low priority information.

2. The traffic alarm method according to claim 1, wherein the higher a priority of the data packet is, the larger a numerical value of the priority of the data packet is.

3. The traffic alarm method according to claim 1, wherein the step (2) comprises:
   sub-step (2.1) adopting the different processing logics according to the different traffic rates: marking the traffic of the data packet passing through the programmable switch by using a built-in meter of the programmable switch, wherein the data packet with the different traffic rates is marked as different colors; when the data packet passes through the programmable switch and the traffic rate of the data packet is greater than or equal to the threshold, marking the data packet as red, and sampling the data packet; and when the data packet passes through the programmable switch and the traffic rate of the data packet is smaller than the threshold, marking the data packet as green, and forwarding the data packet to the receiving end according to forwarding table information; and sub-step (2.2) multicasting on the data packet: connecting a port multicast for transmitting the data packet to the sending end and the receiving end, wherein the data packet is copied into two data packets, one data packet multicasting to the receiving end is not modified and maintains in an original service state; and other data packet multicasting to the sending end carries the priority information to achieve an alarm on the sending end.

4. The traffic alarm method according to claim 3, wherein said sampling comprises: counting the data packet passing through the programmable switch by using a register of the programmable switch, when a quantity of the data packet is greater than or equal to a sampling interval, multicasting on a next data packet after counting, and setting a numerical value of the register to be 0 for re-counting.

5. The traffic alarm method according to claim 4, wherein a value range of the threshold is form 0 to 10 Gbps; and a range of the sampling interval is from 0 to $32^{nd}$ power of 2.

6. The traffic alarm method according to claim 1, wherein the register stores the lowest priority information in the traffic in real time.

7. A traffic alarm apparatus based on a programmable switch, comprising:
one or more processors configured to implement the traffic alarm method based on a programmable switch according to claim 1.

8. An electronic device, comprising:
at least one processor, and
a memory coupled with each other and configured to store program data,
wherein the program data cause the at least one processor to execute the traffic alarm method based on a programmable switch according to claim 1.

9. A non-transitory computer-readable storage medium on which a computer program is stored, wherein the program, when executed by a processor, is configured to implement the traffic alarm method based on a programmable switch according to claim 1.

* * * * *